United States Patent

Stiles et al.

[11] Patent Number: 5,826,052
[45] Date of Patent: Oct. 20, 1998

[54] METHOD AND APPARATUS FOR CONCURRENT ACCESS TO MULTIPLE PHYSICAL CACHES

[75] Inventors: David R. Stiles, Los Gatos; Teresa A. Roth, Redwood City, both of Calif.

[73] Assignee: Advanced Micro Devices, Inc., Sunnyvale, Calif.

[21] Appl. No.: 405,268

[22] Filed: Mar. 13, 1995

Related U.S. Application Data

[63] Continuation-in-part of Ser. No. 236,714, Apr. 29, 1994, abandoned, and Ser. No. 340,176, Nov. 15, 1994.

[51] Int. Cl.⁶ .................................................. G06F 9/38
[52] U.S. Cl. ........................... 395/381; 395/449; 395/467
[58] Field of Search ..................................... 395/375, 449, 395/446, 458, 464, 467, 468, 495, 496, 382, 381, 395

[56] References Cited

U.S. PATENT DOCUMENTS

| | | | |
|---|---|---|---|
| 4,190,885 | 2/1980 | Joyce et al. | 395/183.18 |
| 4,464,717 | 8/1984 | Keeley et al. | 395/449 |
| 4,667,288 | 5/1987 | Keeley et al. | 395/183.01 |
| 4,794,524 | 12/1988 | Carberrry et al. | 395/800 |
| 4,953,073 | 8/1990 | Moussouris et al. | 395/403 |
| 5,155,832 | 10/1992 | Hunt | 395/447 |
| 5,214,765 | 5/1993 | Jensen | 395/449 |
| 5,226,126 | 7/1993 | McFarland et al | 395/394 |
| 5,253,353 | 10/1993 | Mogul | 395/449 |
| 5,293,603 | 3/1994 | MacWilliams et al. | 395/309 |
| 5,301,298 | 4/1994 | Kagan et al. | 395/468 |
| 5,345,576 | 9/1994 | Lee et al. | 395/308 |
| 5,355,467 | 10/1994 | MacWilliams et al. | 395/473 |
| 5,377,336 | 12/1994 | Eickemeyer et al. | 395/383 |
| 5,386,547 | 1/1995 | Jouppi | 395/449 |
| 5,544,342 | 8/1996 | Dean | 395/446 |

*Primary Examiner*—Krisna Lim
*Assistant Examiner*—Viet Vu
*Attorney, Agent, or Firm*—Townsend and Townsend and Crew LLP

[57] ABSTRACT

A cache controller for a system having first and second level cache memories. The cache controller has multiple stage address and data pipelines. A look-up system allows concurrent look-up of tag addresses in the first and second level caches using the address pipeline. The multiple stages allow a miss in the first level cache to be moved to the second stage so that the latency does not slow the look-up of a next address in the first level cache. A write data pipeline allows the look-up of data being written to the first level cache for current read operations. A stack of registers coupled to the address pipeline is used to perform multiple line replacements of the first level cache memory without interfering with current first level cache look-ups. Multiple banks associated with a multiple set associative cache are stored in a single chip, reducing the number of SRAMs required. Certain status information for the second level (L2) cache is stored with the status information of the first level cache. This enhances the speed of operations by avoiding a status look-up and modification in the L2 cache during a write operation. In addition, the L2 cache tag address and status bits are stored in a portion of one bank of the L2 data RAMs, further reducing the number of SRAMs required. Finally, the present invention also provides local read-write storage for use by the processor by reserving a number of L2 cache lines.

15 Claims, 16 Drawing Sheets

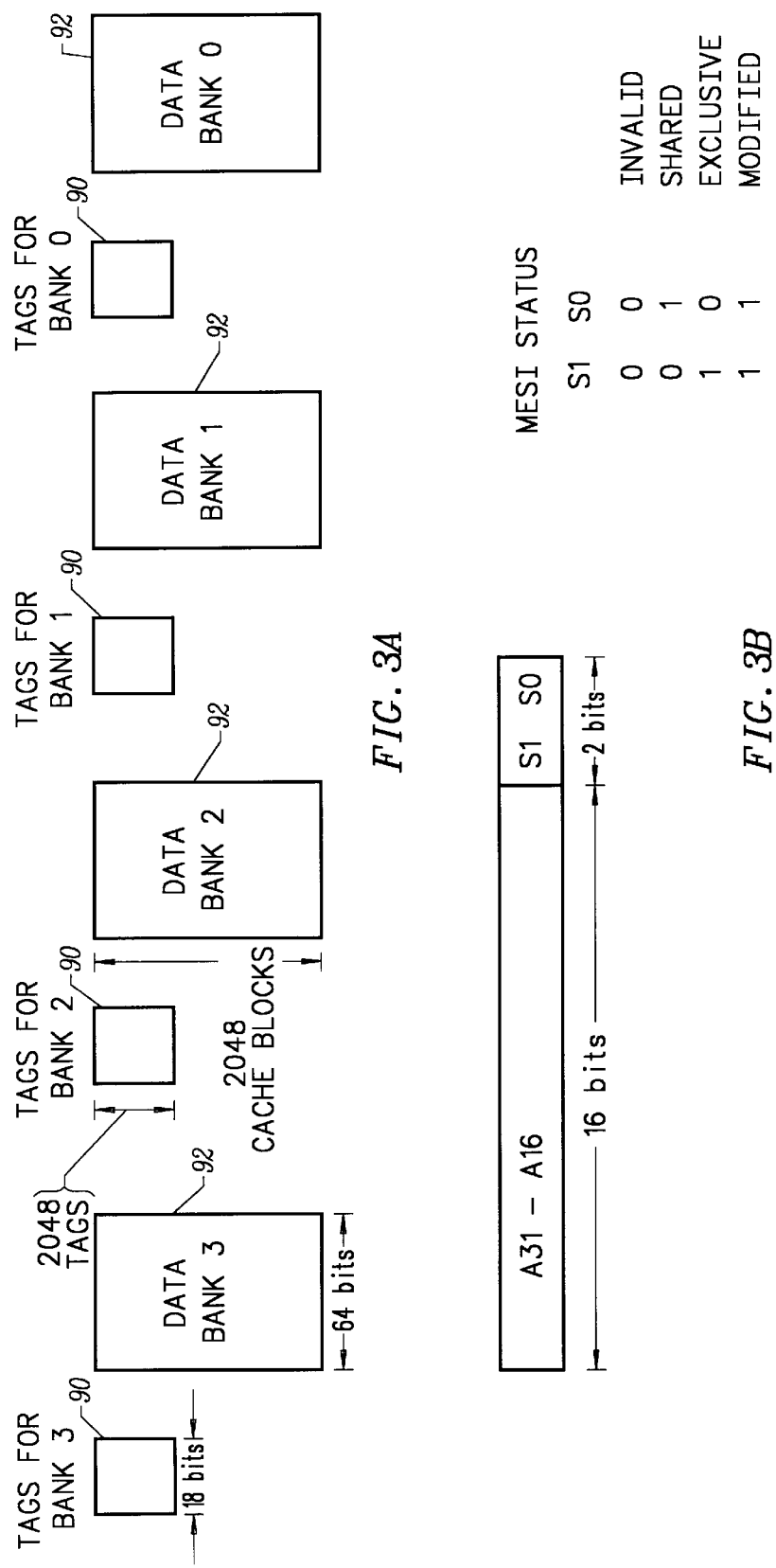

| ADDRESS | | | | | CACHEABILITY | | | | | | | |
|---|---|---|---|---|---|---|---|---|---|---|---|---|
| | | | | | HYPERCODE BANKS | | | | MEMORY BANKS | | | |
| A31 | A30 | A29 | A15 | A14 | 3 | 2 | 1 | 0 | 3 | 2 | 1 | 0 |
| 1 | 1 | 1 | 1 | 1 | tag | nc | nc | nc | nc | nc | nc | nc |
| 1 | 1 | 1 | 1 | 0 | c | nc | nc | nc | nc | nc | nc | nc |
| 1 | 1 | 1 | 0 | 1 | c | nc | nc | nc | nc | nc | nc | nc |
| 1 | 1 | 1 | 0 | 0 | c | nc | nc | nc | nc | nc | nc | nc |
| 1 | 1 | 0 | x | x | nc | nc | nc | nc | nc | nc | nc | nc |
| 1 | 0 | x | x | x | nc | nc | nc | nc | nc | nc | nc | nc |
| 0 | 1 | x | x | x | nc | nc | nc | nc | nc | nc | nc | nc |
| 0 | 0 | 1 | 1 | 1 | nc | nc | nc | nc | tag | c | c | c |
| 0 | 0 | 1 | 1 | 0 | nc | nc | nc | nc | nc | c | c | c |
| 0 | 0 | 1 | 0 | 1 | nc | nc | nc | nc | nc | c | c | c |
| 0 | 0 | 1 | 0 | 0 | nc | nc | nc | nc | nc | c | c | c |
| 0 | 0 | 0 | 1 | 1 | nc | nc | nc | nc | tag | c | c | c |
| 0 | 0 | 0 | 1 | 0 | nc | nc | nc | nc | c | c | c | c |
| 0 | 0 | 0 | 0 | 1 | nc | nc | nc | nc | c | c | c | c |
| 0 | 0 | 0 | 0 | 0 | nc | nc | nc | nc | c | c | c | c | x   don't care
nc  non cacheable
c   cacheable
tag reserved for tag storage

*FIG. 4C*

| Access | SRAM Address Lines | | | | | | |
|---|---|---|---|---|---|---|---|
| | C14 | C13 | C12 | C11 | C10–C2 | C1 | C0 |
| Data Bank 3 | 1 | 1 | A15 | A14 | A13–A5 | A4 | A3 |
| Data Bank 2 | 1 | 0 | A15 | A14 | A13–A5 | A4 | A3 |
| Data Bank 1 | 0 | 1 | A15 | A14 | A13–A5 | A4 | A3 |
| Data Bank 0 | 0 | 0 | A15 | A14 | A13–A5 | A4 | A3 |
| Tag | 1 | 1 | 1 | 1 | A13–A5 | A15 | A14 |

C14–C0    Address lines to the cache SRAMs
A15–A3    Address from the L2 controller

*FIG. 4D*

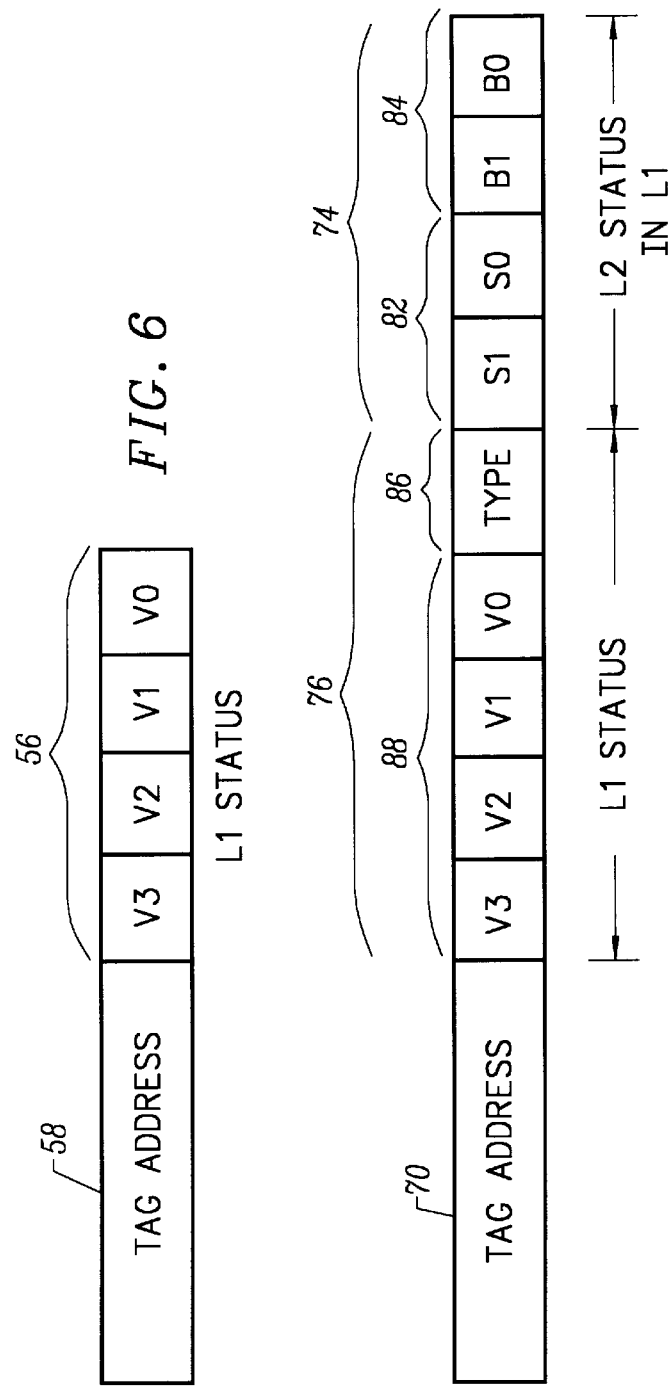

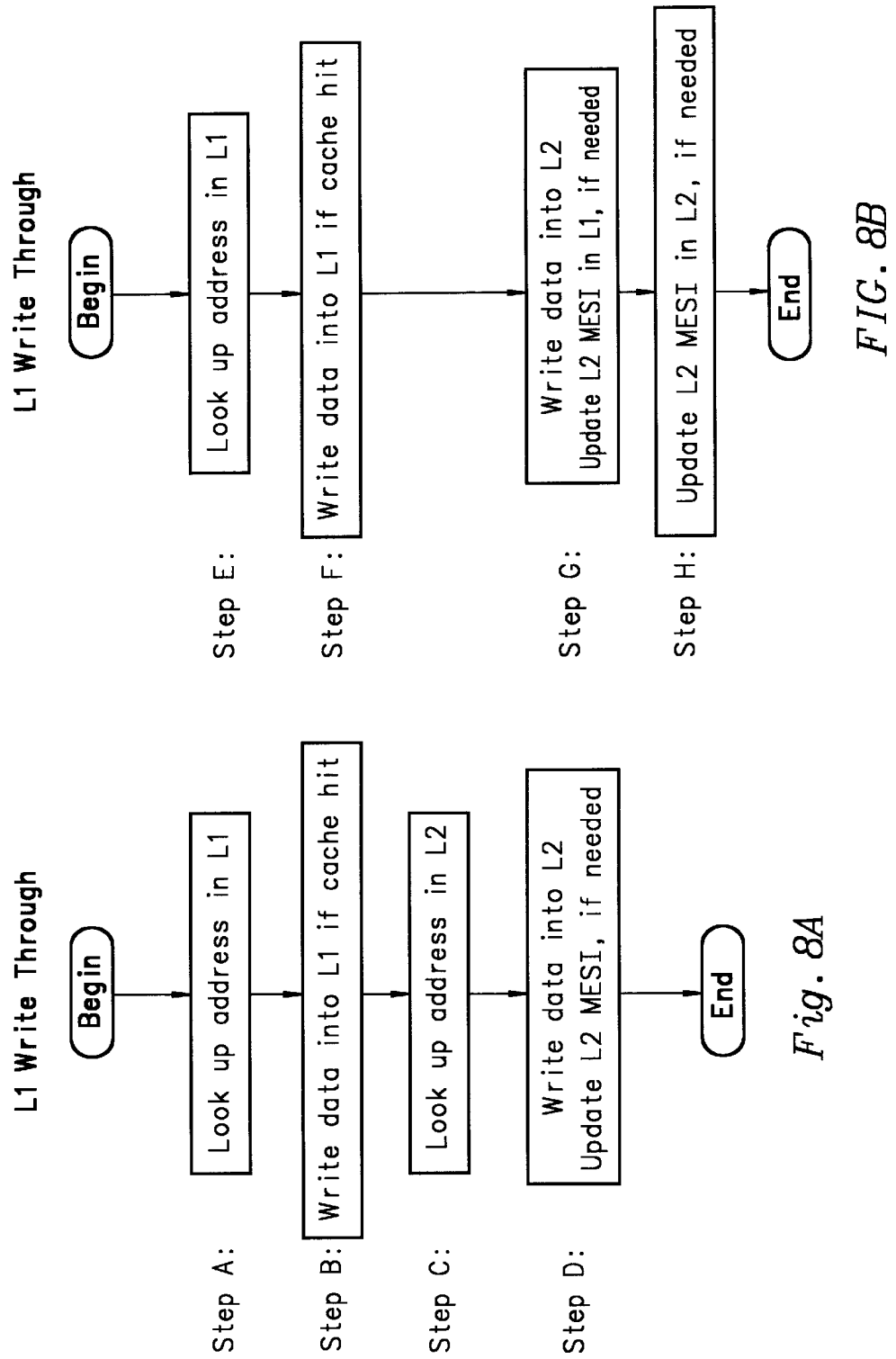

METHOD AND APPARATUS FOR CONCURRENT ACCESS TO MULTIPLE PHYSICAL CACHES

This application is a continuation-in-part of Ser. No. 08/236,714, filed Apr. 29, 1994 now abandoned and Ser. No. 08/340,176, filed Nov. 15, 1994, each of which is hereby incorporated by reference.

BACKGROUND OF THE INVENTION

The present invention relates to cache control systems for fast cache memories in a microprocessor-based computer system. In particular, the invention relates to the replacement of first level cache lines with lines from the second level cache and to the storing of tag address and status information for the cache.

Many computer systems today use cache memories to improve the speed of access to more frequently used data and instructions. A small cache memory may be integrated on the microprocessor chip itself, thus greatly improving the speed of access by eliminating the need to go outside the chip and access data or instructions from an external DRAM memory. Another system uses a second level cache as well which is typically made up of SRAM memory chips outside the microprocessor. Access to the SRAM chips is much faster than access to the DRAM chips. The SRAM chips are much more expensive than the DRAM chips, however, so it is not cost effective to simply replace all the DRAM chips with SRAMs. Typically, a small first level cache is integrated on the microprocessor chip itself for the most frequently used data and instructions. A larger second level SRAM cache is used to store a larger amount of data and instructions, but less than the full memory.

During a normal data accessing routine, the microprocessor will first look in the first level cache to see if the desired data or instructions are resident there. If they are not, it will then go to the second level cache. If they are not resident in the second level cache, it will then go to the DRAM system memory.

The first level cache is a subset of the second level cache, which is a subset of the main memory. Since the cache is smaller than main memory, multiple main memory locations may be mapped into the same cache location. The cache entries must contain not only the relevant data, but also enough information ("tag address and status" bits) about the address associated with the data to be unambiguous. Hence, the cache must be wider than the data stored in it. To improve the cache "hit ratio", it is also desirable for the caches to be set associative, i.e., a particular location in memory may be stored in multiple locations ("sets") in the cache. The width of the cache (and the number of SRAMs used to implement the cache) doubles or quadruples for a 2- or 4-way set associative cache, respectively, compared to a 1-way set associative ("direct mapped") cache. It is desirable to reduce the number of SRAMs required to implement a cache from both cost and electrical performance reasons.

When writing to a memory location, a write to the first level cache must be copied to the second level cache and the main memory as well to maintain consistency. The writing to the second level cache will use up cycle time on the bus which will sometimes delay the processing of a next instruction while this "housekeeping" function of making the first level and second level caches consistent is being performed. In other situations, one of more lines from the second level cache may be brought into the first level cache even though they are not immediately needed by the microprocessor. Some delays are especially significant when central processing unit designs attempt to achieve higher throughput by incorporating parallelism and pipelining. For example, an attempt to read something which is being copied from the second-level cache to the first level cache requires waiting for the copy to be completed, or accessing the second level cache a second time.

SUMMARY OF THE INVENTION

The present invention relates to storing the multiple banks associated with a multiple set associative cache in one physical bank, thus reducing substantially the number of SRAMs required to implement an L2 cache. In another aspect of the present invention, the tag address and status bits are also stored in the same physical bank as the data instead of separate physical banks as is the case in prior art systems.

In a preferred embodiment of a 4-way set associative 256K byte cache, a 256K byte physical bank is partitioned into four logical 64K byte banks, replacing the conventional four separate physical banks of 64K bytes in prior art implementations with just one physical bank of 256K bytes. In addition, the tag address and status information is stored in a portion of one of the logical banks, eliminating four additional physical banks of SRAMs associated with tag address and status bits in prior art implementations. In effect, this makes the cache 4-way set associative for most data, but only 3-way set associative for data-that would have otherwise ended up in the area used by the tags. This arrangement also requires two accesses for L2 look-ups, the first for tag information and the second for the actual data, instead of just one access in prior art implementations which can look up tag and data in one access. This arrangement would also necessitate two accesses to the L2 cache for a write, first for tag look-up and second for writing the data. A third access may be-required for updating the status bits if there is a change of status. Prior art implementations can avoid the third access since status and data can be written in the same cycle. The advantages of this arrangement are a substantial reduction in the cost of SRAMs and improvement in the electrical performance of the cache by eliminating loads on the cache address and data buses. Even though the present invention requires an additional access for a read and, sometimes, for a write, each access can be done faster due to the improvement in the electrical performance.

Another aspect of the present invention relates to enhancing the status information stored in the first level cache. In addition to the conventional status information such as valid and dirty, the L1 tags store "type" bits to classify a cache block. These bits, for example, may indicate that the cache block is defective so that a block of memory is never allocated to it, thus permitting the use of a microprocessor with some number of defects in its on-chip cache. Certain status information for the L2 cache is also stored with the status information of the L1 cache. This enhances the speed of operations by avoiding the cycle for tag look-up in the L2 cache during a write operation.

In a preferred embodiment, the L2 status includes two status bits S1 and S0 to implement a write-back MESI protocol (which define four states for an L2 cache block—Modified, Exclusive, Shared and Invalid). In addition, where the L2 cache is a 4-way set associative cache, an indication of which of four banks the data is stored in is included with the status information stored in the L1 cache. This eliminates the need for a tag look-up in the L2 cache for writes which hit in the L1 cache since the data is known to be present in the L2 cache if there is a hit in the L1 cache, and the only information needed is which bank the data is going to be stored in.

The present invention also provides local read-write storage for use by the processor by allocating a number of L2 cache blocks. The data in these cache blocks is not accessible to normal programs, and there is no need for physical main memory which corresponds to these locations. This area would be useful for certain reserved ("hypercode") storage for system management software or writable control programs for the microprocessor. It is desirable for performance reasons to give higher priority to these reserved blocks so that they are less likely to be replaced (or never replaced) when an existing cache block needs to be moved out to make room for a new block of memory.

The present invention further provides a cache controller for a system having a first level cache memory and a second level cache memory. The cache controller has a multiple stage address pipeline. A look-up control system associated with the address pipeline allows the concurrent look-up of tag addresses in the first and second level caches. If there is not a hit for a first stage pipeline in the first level cache, that address is moved to the second stage for look-up in the second level cache, while a new address can be entered into the first stage for look-up in the first level cache. This avoids having to stall the machine while a first level cache miss is doing a subsequent comparison with second level cache tags. Cache control is also described in the patent application titled "SEMI-AUTONOMOUS RISC PIPELINES FOR OVERLAPPED EXECUTION OF RISC-LIKE INSTRUCTIONS WITHIN THE MULTIPLE SUPERSCALAR EXECUTION UNITS OF A PROCESSOR HAVING DISTRIBUTED PIPELINE CONTROL FOR SPECULATIVE AND OUT-OF-ORDER EXECUTION OF COMPLEX INSTRUCTIONS," application Ser. No. 08/403,988, filed Mar. 13, 1995, assigned to the same assignee as the present invention and hereby incorporated by reference.

Additionally, the present invention preferably provides comparison circuitry to allow a read address to be compared with addresses in the address pipeline, and thus determine if there is a hit on an address not currently in the first level cache, but which is about to be written to the first level cache. A data pipeline is provided corresponding to the address pipeline for storing write data, which is thus readily available if there is a read hit upon an address in the address pipeline. Preferably, two pipelines are provided, one for write data and another one for data read from the cache.

Finally, the present invention provides a method and apparatus for performing multiple line replacements of a first level cache memory from a second level cache memory. A latch is provided to hold the address of the next line of the second level cache memory to be accessed. This is coupled to a stack of registers for holding the multiple line replacement addresses. A multiplexing mechanism is provided for putting either the next address from the stack into a latch for a second level cache access, or selecting a higher priority access, such as an access required on a cache miss in the first level cache memory.

In a preferred embodiment, the latch for the second level cache address is part of the address pipeline connected to the stack. The pipeline provides the addresses for both the second level cache and the first level cache. The corresponding data pipeline holds data to be written to the first level cache.

In a preferred embodiment of the cache controller, separate queues are provided for instruction fetches, memory reads and memory writes. The first level cache itself is preferably broken into two caches, one for instructions and one for data.

For a full understanding of the nature and advantages of the present invention, reference should be made to the following description taken in conjunction with the accompanying drawings.

BRIEF DESCRIPTION OF THE DRAWINGS

FIG. 3A is a diagram showing a prior art implementation of a 256K byte 4-way set associate L2 cache with 2K×8 SRAMs for tag and 8K×8 SRAMs for data;

FIG. 3B shows the tag address and status bits for the prior art implementations shown in FIG. 3A;

FIGS. 4A, 4B, 4C and 4D are diagrams illustrating the use of a portion of a bank of the data cache RAM for tags and assumptions about cacheable regions of the address space to reduce the number of address bits to be stored in the tags and allocating an area for local read/write storage;

FIG. 6 is a diagram illustrating the tag and status fields for the L1 cache of the prior art;

FIG. 7 is a diagram illustrating the tag and status information in the L1 cache according to the present invention; and FIGS. 8A and 8B are flow charts showing an L1 write-through operation in a prior art two-level cache system in FIG. 8A and the two-level cache system of the present invention in FIG. 8B.

DESCRIPTION OF THE PREFERRED EMBODIMENT

Figure 1:
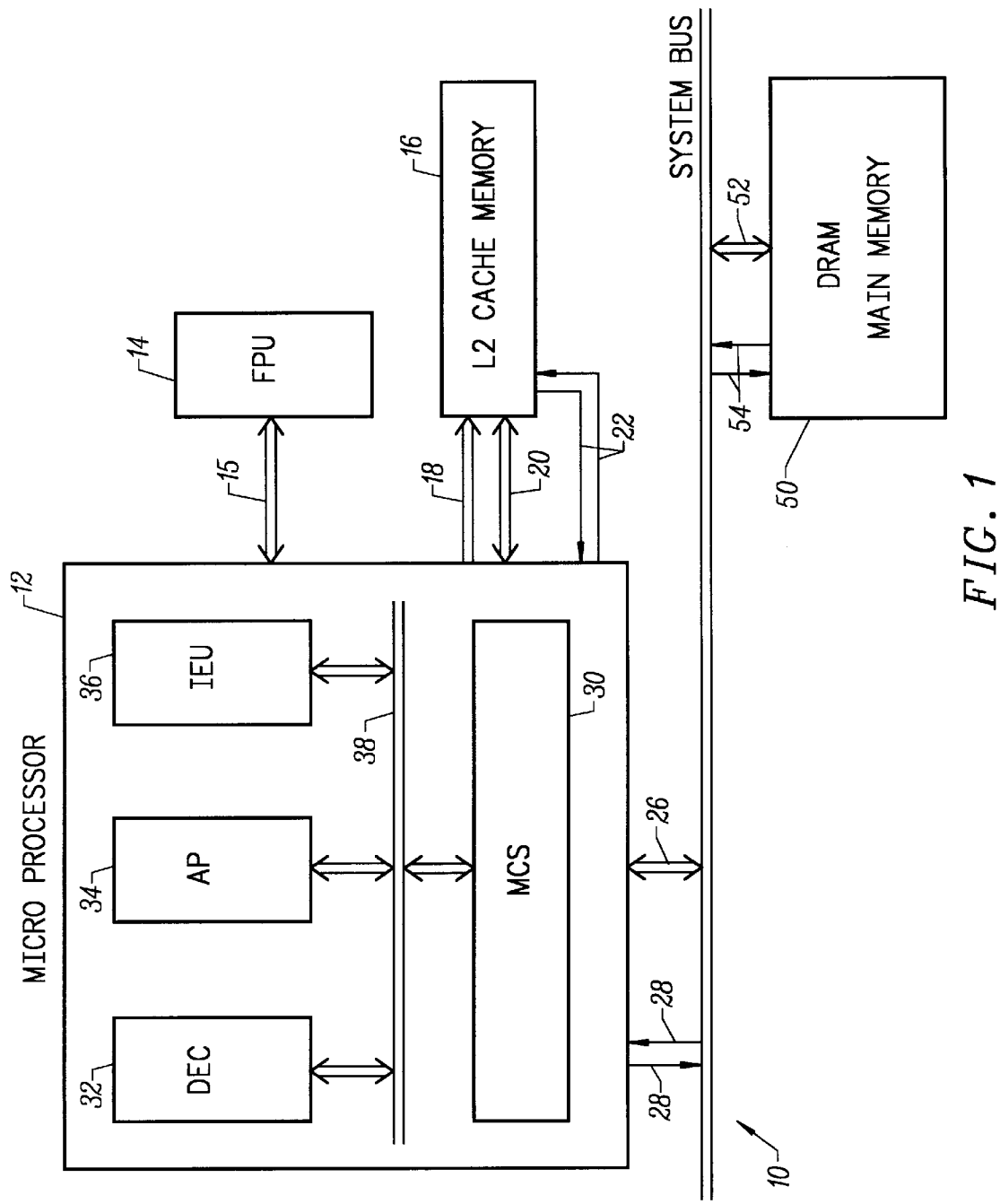
FIG. 1 is a diagram of a computer system architecture using both a first level and a second level cache memory.

FIG. 1 shows a computer system 10 having a microprocessor 12 on a single chip. A separate chip 14 is a floating point unit (FPU) connected to microprocessor 12 by a bus 15. An SRAM based second level (L2) cache memory 16 is connected to microprocessor 12 by an address bus 18, data bus 20 and control lines 22. A system bus 24 is connected to the microprocessor through address and data bus 26 and control lines 28. The system bus 24 connects to the main DRAM memory 50 through address and data bus 52 and control lines 54.

The microprocessor is shown as including a memory control system (MCS) 30 including part of the present invention. The microprocessor includes an instruction decoder (DEC) 32 which performs instruction fetch, instruction decode and pipeline control. This unit can interleave instruction prefetches of up to three simultaneous instruction streams and it contains a fully-associative branch prediction cache which is described in U.S. Pat. No. 5,093,778, hereby incorporated by reference. An address preparation unit (AP) 34 calculates effective addresses, performs segment relocation and implements a demand page memory management system. It contains a translation look-aside buffer.

An integer execution unit (IEU) 36 performs single cycle execution of most integer instructions. It contains a multiplier and accumulator array, as well as microcode for integer multiply and divide instructions. The pipeline control architecture allows the IEU to perform parallel and/or out-of-order execution of integer instructions. A more complete description of these units is contained in U.S. Pat. No. 5,226,126, hereby incorporated by reference. The DEC, AP and IEU units communicate with MCS 30 through an internal bus 38.

Figure 2:
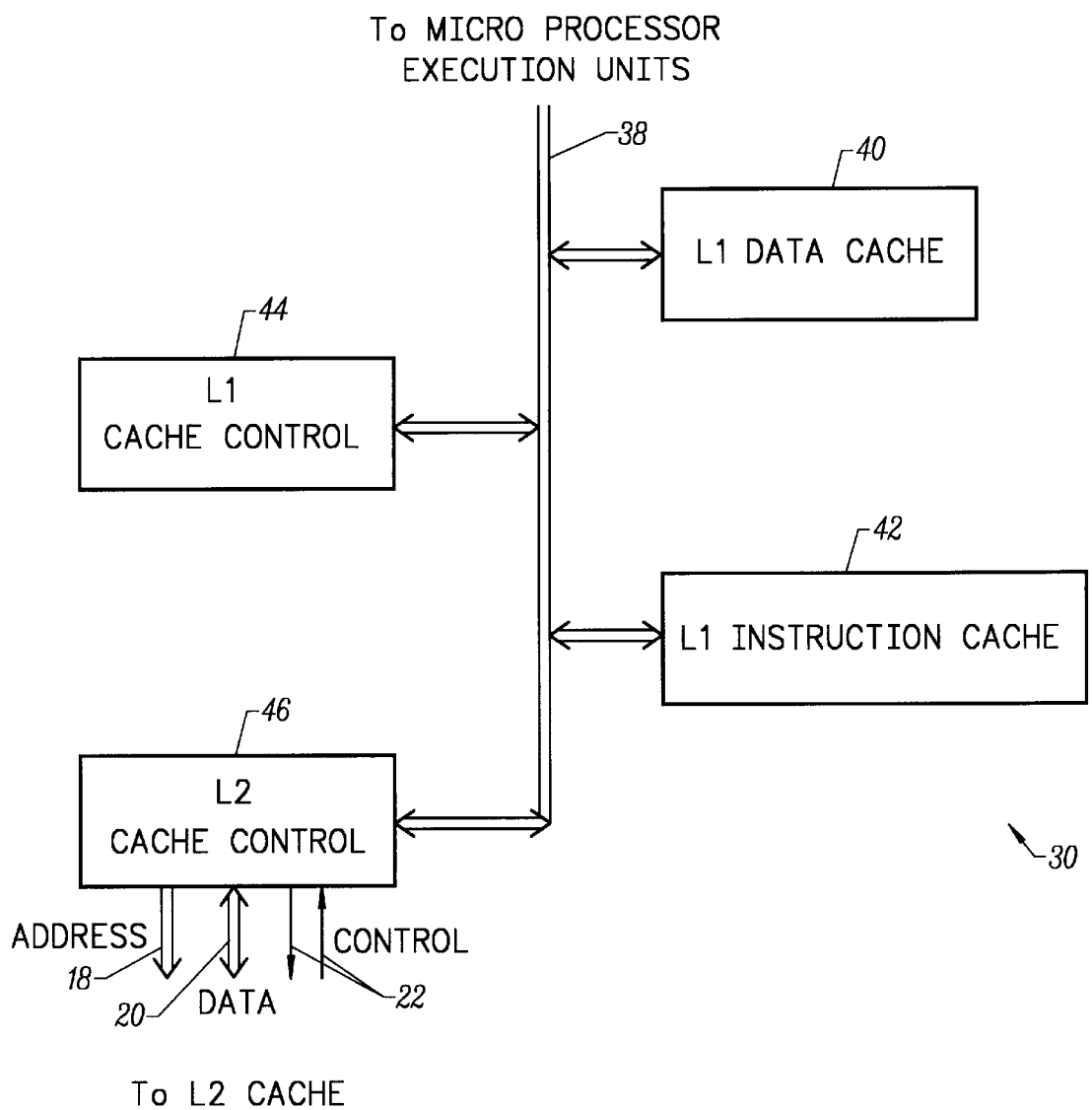
FIG. 2 is a block diagram of the memory control system (MCS) of FIG. 1.

FIG. 2 is a block diagram of the memory control system MCS 30 of FIG. 1. The memory control system (MCS) contains the Level 1 (L1) cache, which consists of separate data cache 40 and instruction cache 42. Also shown are the L1 cache control circuit 44 and the L2 cache control circuit 46.

FIG. 3A shows a typical prior art configuration for a 4-way set-associative second level cache. This will include four physical banks of SRAM chips 90 for storing the tag addresses and status bits, and four physical banks of SRAM chips 92 for storing the cache data.

A 32-bit address (A31 through A0, with A31 being MSB and A0 being LSB) is presented to the 256K byte 4-way set associative cache, organized as four physical banks of 2048 cache blocks, with each cache block subdivided into four sub-blocks ("words") of 8 bytes. Address bits A15 through A3 are used to select four cache words, one from each physical bank for cache data. Address bits A15 through A5 are used to select four tags, associated with the four blocks, from the four physical banks for tags. Each tag stores address bits A31 through A16 and two status bits S1 and S0 to implement a MESI write back cache protocol. Address bits A31 through A16 are compared with the A31 through A16 bits stored in the four selected tags. The tag bit assignments are shown in FIG. 3B. If there is a match, 64 bits of data from the physical bank with the matched tag are selected along with the two MESI status bits in the matched tag, and returned to the processor. Data read from the other three physical banks is unused.

A typical prior art cache, shown in FIG. 3A, will require 9 16K bit SRAMs (organized as 2K×8) for tags to accommodate 72 (18×4) tag bits, and 32 64K bit SRAMs (organized as 8K×8) to accommodate 256 (64×4) data bits, for a total of 41 chips. Even if higher density SRAMs are available (for example, 32K×8 bits), the number of chips required will remain the same even though a larger cache can be built.

Figure 4A:
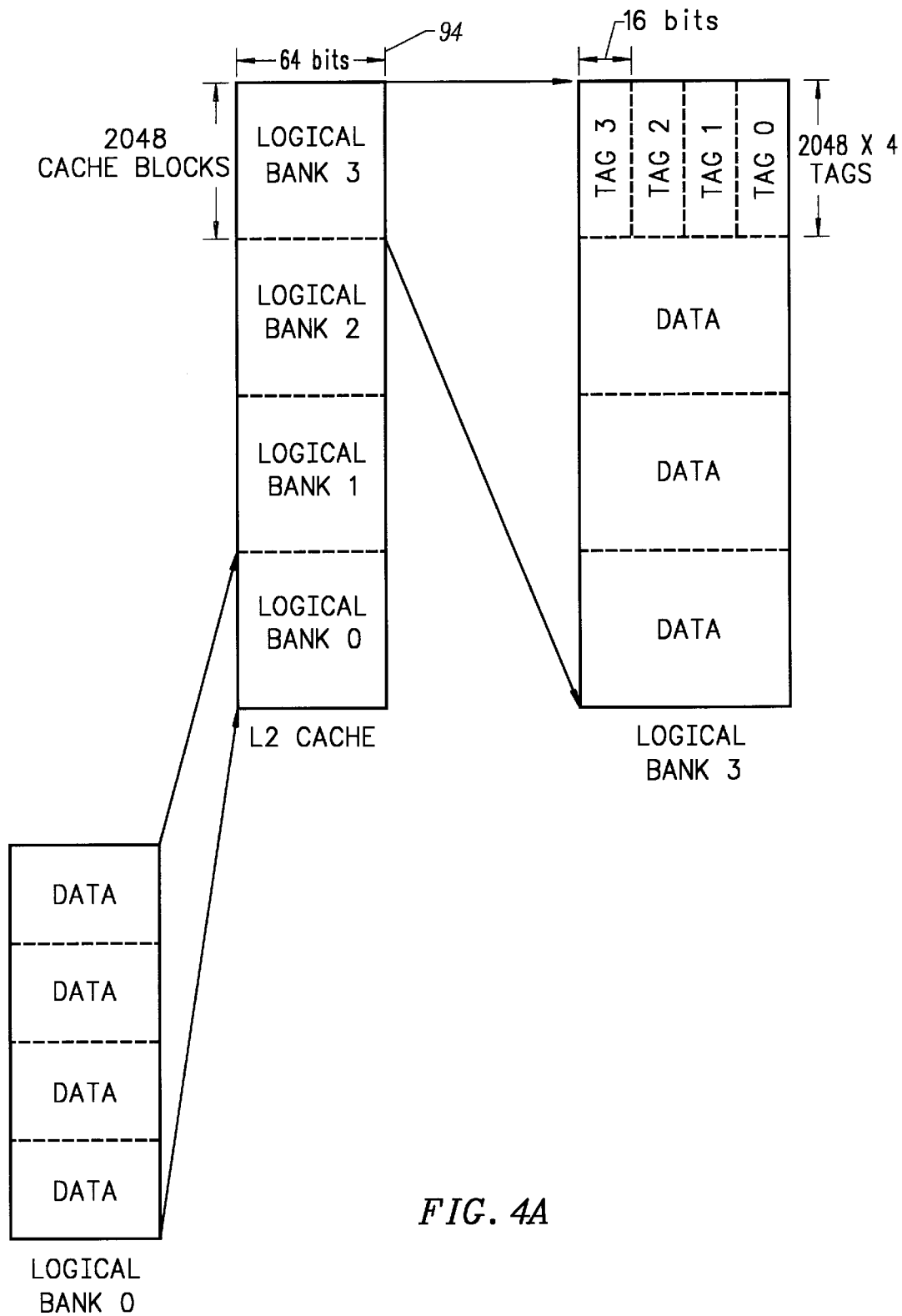
Figure 4B:
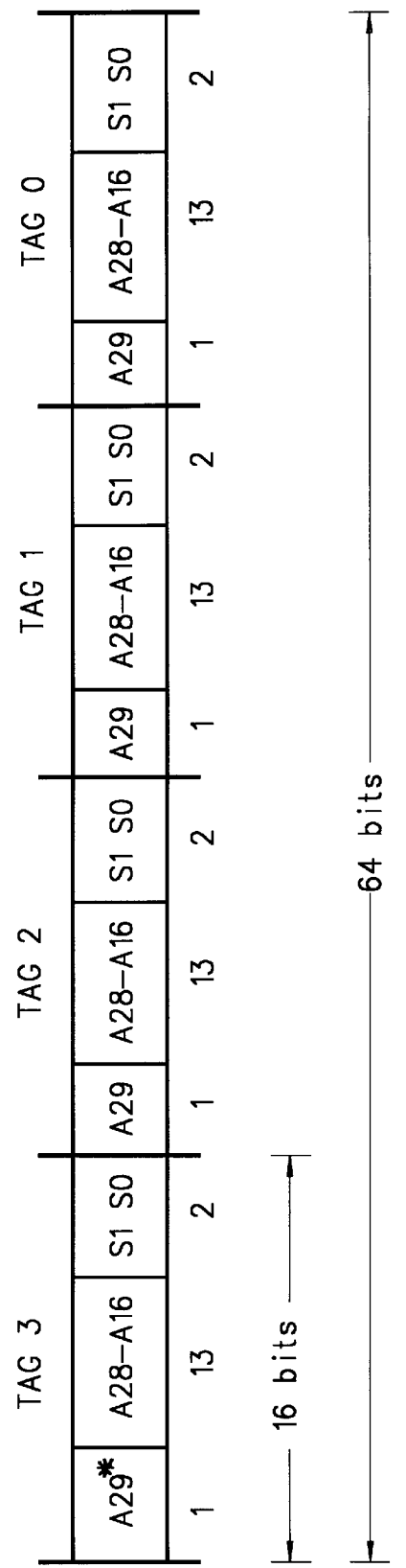

In the present invention, shown in FIG. 4A, all the data is stored in one physical bank of SRAMs 94. In a preferred 4-way set associative embodiment, data is stored in four logical banks, numbered 0 through 3. Each bank has 2048 cache blocks of 32 bytes each. Each cache block is subdivided into four sub-blocks (words) of 64 bits (8 bytes). Physically, the 256K byte cache is implemented by one bank of 8 256K bit (organized as 32K×8) SRAMs. The top 512 blocks of bank 3 are reserved for address tags and status bits. FIG. 4B shows the field assignments for the tags. Note that there are only 16 bits per tag as compared to the 18 bits in the prior art implementation shown in FIG. 3B. As in prior art, two status bits S1 and S0 denote the MESI state of the corresponding cache block. The tag also stores address bits A28 through A16, and a modified version of address bit A29, denoted as A29*. In the implementation shown, the microprocessor has the capability to address two distinct address spaces, a reserved local read/write storage space ("hypercode") for the microprocessor and the conventional memory space. A29* is the same as A29 for memory address and set to "1" for the reserved address space. The areas of address spaces that may be cached are restricted as shown in FIG. 4C. Furthermore, hypercode is restricted to be cached only in logical bank 3. By specifications, hypercode accesses may be cached only in bank 3 if A31=A30=A29=1. Memory addresses may be cached in banks 3, 2, 1 or 0 if A31=A30=A29=0. Memory accesses with A31=A30=0 and A29=1 may be cached only in logical banks 2, 1 or 0. Neither memory nor hypercode accesses with A15=A14=1 may be cached in logical bank 3 since it is the area reserved for tags. Note that the degree of associativity in the Level 2 cache changes with the type of address space (degree of 1 for hypercode and degree of 3 or 4 for memory) and the address range (degree of 3 or 4 for memory, depending on the address range). Certain address ranges are not cacheable. By specification, hypercode cache blocks are never replaced by memory cache blocks in Level 2, giving hypercode priority over memory for cache replacements. Even though the hypercode is direct mapped (degree of 1), it is effectively "locked" into the Level 2 cache.

With the above assumptions, the A31, A30 and A29 tag bits of the prior art implementations in FIG. 3B, can be replaced by A29 in tags 0, 1 and 2, and A29* in tag 3, thus reducing the number of tag bits from 18 to 16. Four tags (corresponding to the 4 sets) can now occupy one location since the tags are 16 bits wide and each location can accommodate 64 bits. There are 4 sets of 2048 cache blocks, requiring a total of 8196 tags since a tag is required to uniquely identify each cache block. Thus, tags use up 2048 locations.

The tag locations can be compressed to occupy the upper quarter of logical bank 3 by using the SRAM addressing scheme shown in FIG. 4D. There are 15 address lines for the SRAMs to address 32K words—4 sets of 2048 cache blocks, with each block subdivided into 4 sub-blocks (words). The SRAM address lines C14 and C13 are selectively controlled by the L2 cache control 46 to address 1 of 4 logical banks. The SRAM address lines C12–C0 reflect memory address A15 through A3. Note that the memory address A29–A16 is resolved by tag comparison, memory address A31–A30 is resolved by convention, as described above, and memory address A2–A0 specifies 1 of 8 bytes in a word. When accessing logical bank 3 for tags, the address lines C14–C13 are set to 11 (for logical bank 3), C12–C11 are set to 11 (for the upper quarter of logical bank 3) and the memory address A15–A14 is reflected on C1–C0 by the L2 cache control to compress the tag locations into the upper quarter of logical bank 3.

Figure 5:
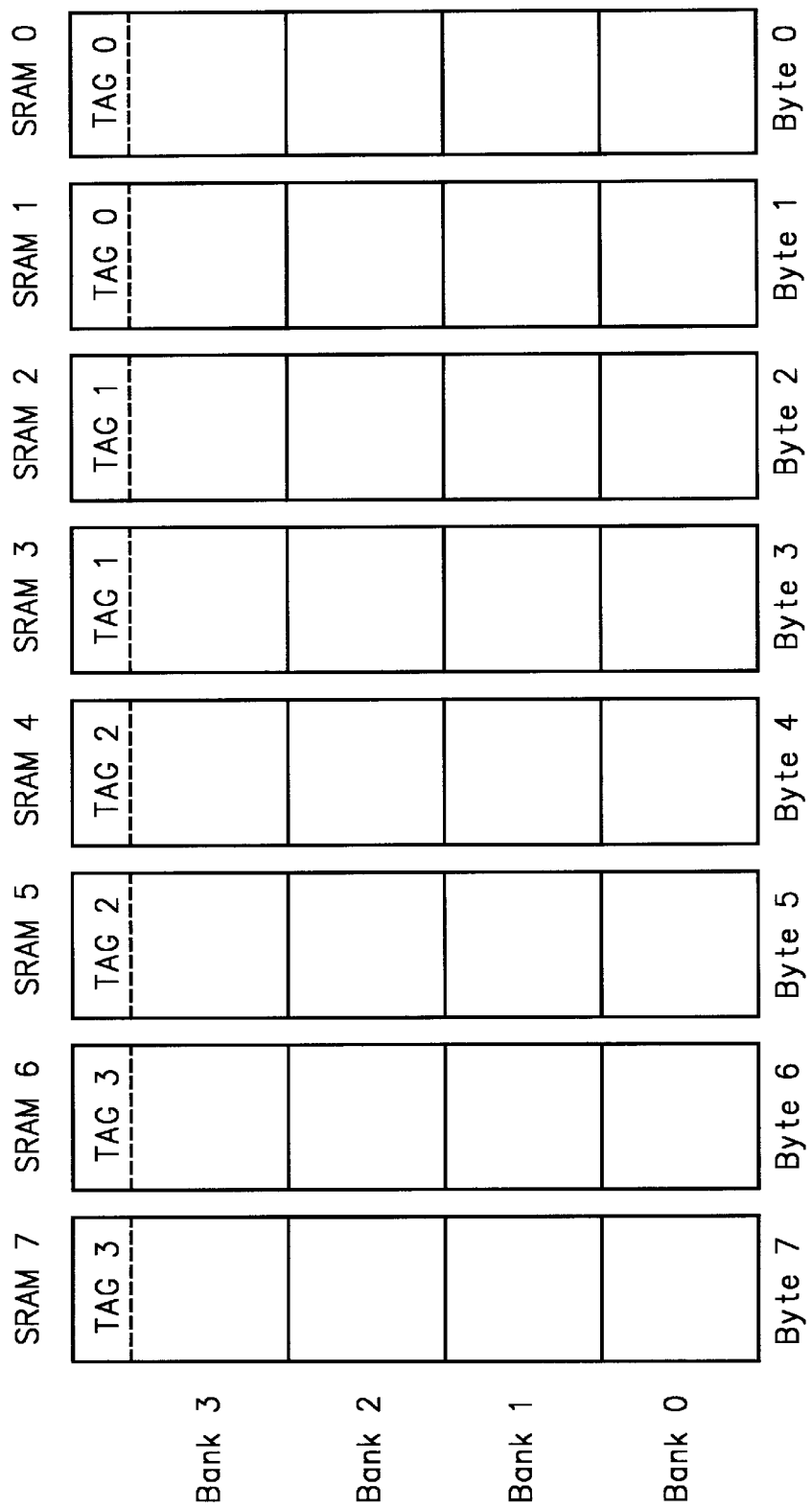
FIG. 5 is a diagram of an eight chip implementation of the 256K byte L2 cache of the present invention using 32K×8 SRAMS.

FIG. 5 shows the organization of the cache 94 in more detail. In the preferred embodiment of FIG. 5, eight physical SRAM chips, SRAM 0-SRAM 7, are used. Each SRAM is preferably a 32K by 8-bit chip. The 8-bit output forms a single byte of data, with the 8 chips providing 8 bytes, or 64 bits of information. The portion of each chip used for the tags will store one-half of a 16-bit tag. Thus, SRAMs 0 and 1 are used to provide the tag address and status bits for logical bank 0, SRAMs 2 and 3 the tag address and status bits for logical bank 1, SRAMs 4 and 5 the tag address and status bits for logical bank 2, and SRAMs 6 and 7 the tag address and status bits for logical bank 3. As can be seen, tags for all 4 logical banks can be addressed simultaneously on the same outputs used for the 64-bit data. The tags are then compared in the L2 cache control 46 for a match. If there is a match, a second cycle is initiated to read the data from the corresponding logical bank.

FIG. 6 illustrates the tag and status information in the L1 cache as in the prior art. In the tag portion of the cache, a particular entry would typically have an address tag 58 along with the status information 56. The status information would contain a number of status bits. For instance, a valid bit V3 in 56 indicates whether the data in sub-block 3 of the cache block is valid or not.

In the present invention, the L1 status bits 76 include type information 86 in addition to the conventional valid bits 88 for each sub-block ("word") in the cache block. These type bits may be set, for example, by the system management software, on power up, to specify certain defective blocks. Data will not be allocated to these defective blocks. The type bits may also be set, for instance, by the microprocessor logic to denote that certain cache blocks are used for performance sensitive data, for example, a software stack. It may be desirable to give these blocks higher priority when choosing which cache block to replace to make space for a new block of memory. Note that there are no individual sub-block valid bits for the L2 cache since by specification all the sub-blocks of an L2 cache block are either all present or all absent.

In the present invention, as shown in FIG. 7, an entry line in the level 1 cache would include an address tag 70, along with the L1 status 76. In addition, the L2 status bits 74 would be stored in the L1 cache as well. The L2 status bits would include the MESI bits 82. In addition, one or more bank bits 84 indicate which bank of a multiple-way set associative L2 cache the data came from.

The storing of the bank bits eliminates the need to do a tag look-up for a write when there is a hit in the L1 cache. This is useful for a write-through operation, in which data written to the L1 cache is automatically written to the L2 cache, as well, to maintain coherency.

FIGS. 8A and 8B illustrate the advantages of the storing of the L2 status information in the L1 cache according to the present invention. In a typical write-through operation in the prior art indicated in FIG. 8A, a write instruction first compares the write address to the first level cache tags (Step A). Upon a hit, the data is then written in the first level data cache (Step B).

Next, the prior art would access the second level tags in the external, second level cache. This would enable a determination of which bank the data is located in (Step C). The data is then written to the second level data cache (Step D) and simultaneously, the status bits in the second level cache are updated, if needed.

FIG. 8B shows the comparable write-through process according to the present invention. As will be seen, Step C of the prior art is eliminated. In the first step, the address is compared to the first level address tags as in the prior art (Step E). The data is then written to the first level data cache (Step F). During Step E the status information for both the first level and the second level cache was accessed from the first level cache tags. This enables the determination of which bank the data is in the second level cache, eliminating the need for a tag read prior to the step of writing into the second level cache (Step G). Step H is optional if the status bits need to be updated in the L2 cache.

Another aspect of the present invention deals with the use of a portion of one bank of the L2 cache for reserved local read/write storage ("hypercode") by the microprocessor. This area would have several uses. It could be used for a writable control program to emulate certain microprocessor instructions not implemented in hardware or on-chip microcode. Alternately, this area could be used for storing branch prediction information, such as when a branch prediction cache in the microprocessor overflows. The area could also be used by system management software for saving the state of the processor in power up and down and suspend/resume operations. This area would satisfy the criteria for such operations in that hypercode space cached in L2 is not accessible by normal applications programs running on the microprocessor.

The logical bank 3, not occupied by the tags, may be used to cache either hypercode or memory address space. However, priority is given to hypercode in cache replacements. Normally, the least recently used (LRU) cache line is replaced if needed to make space for a new entry. However, if bank 3 block is occupied by hypercode, it will not participate in the LRU algorithms to make space for a new block of physical memory. A hypercode entry may be replaced by another hypercode entry.

Figure 9:
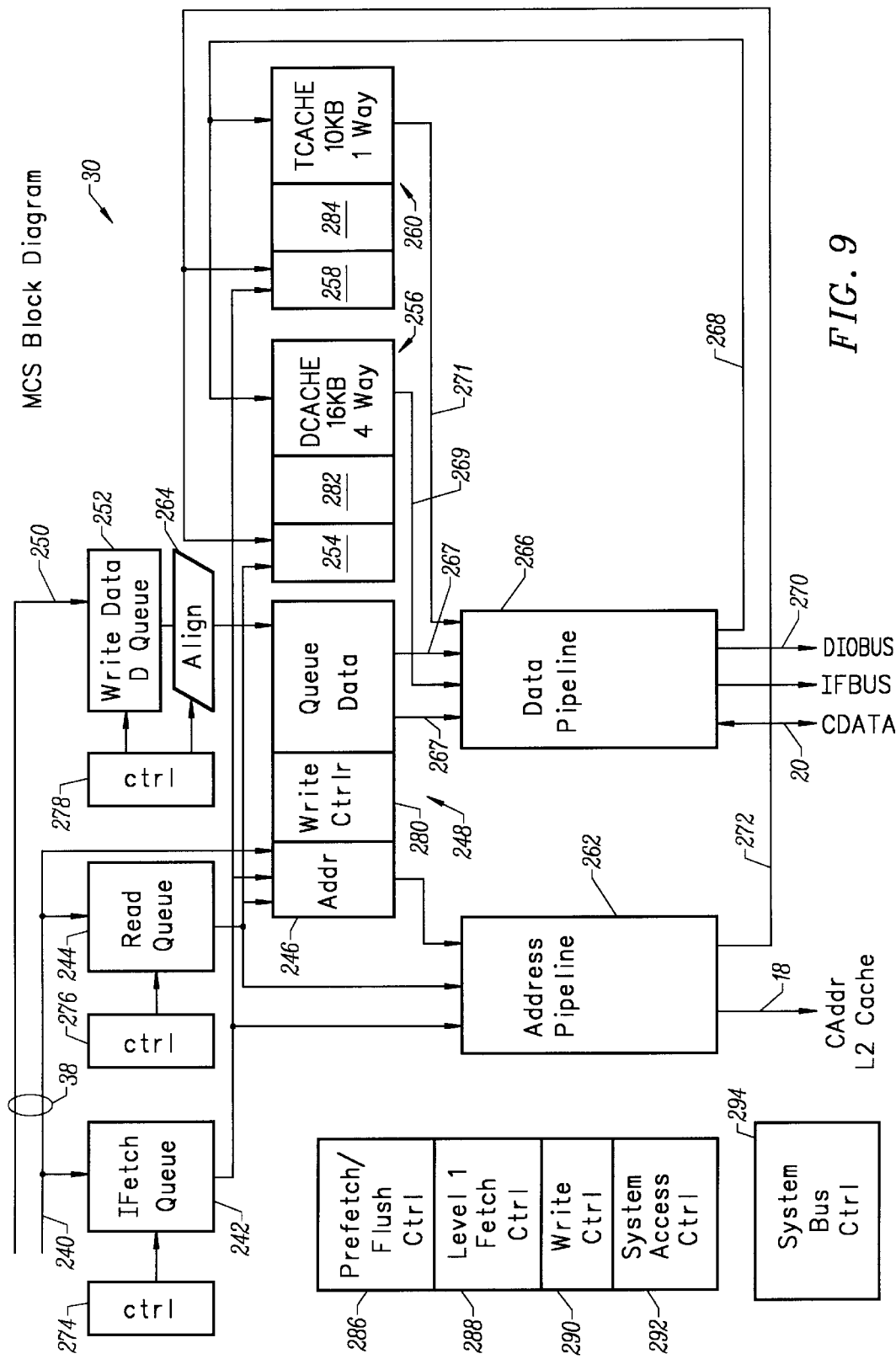
FIG. 9 is a detailed block diagram of the components of the memory control system of FIG. 1.

FIG. 9 is a detailed block diagram of the components of MCS 30 of FIG. 1. Internal microprocessor buses 38 are shown at the top. An address bus 240 (a portion of buses 38) is provided to an instruction fetch queue 242, a read queue 244 and the address portion 246 of a second write data queue 248. The data portion 250 of bus 38 is provided to a first write data queue 252.

The addresses from the instruction fetch queue and read queue can be provided directly to the address portion 254 of the data cache 256, and the address portion 258 of an instruction cache 260. The addresses are also provided to an address pipeline 262, which has an output going to the data and instruction caches as well.

The data from the first write data queue 252 is aligned in an alignment circuit 264 and provided to the second write data queue 248. The data from write queue 248 is provided to a data pipeline 266 on bus 267. Data pipeline 266 provides data to the data and instruction caches on bus 268. The data pipeline also provides data to the off chip, second level cache 16 of FIG. 1 on data lines 20. Data is also provided back to the processor units on data bus 270, which is part of bus 38 shown in FIG. 1. Read data from the data and instruction caches are provided to the data pipelines on buses 269 and 271, respectively. The address pipeline provides addresses to the first level data and instruction caches 256 and 258 on bus 272, and provides addresses to the external second level cache 16 of FIG. 1 on address bus 18.

Various control circuits are shown for the different elements of FIG. 9. A controller 274 is provided for instruction fetch queue 242, a controller 276 for read queue 244 and a controller 278 for first write data queue 252. Second write data queue 248 includes a controller 280, first level data cache 256 includes a controller 282, and first level instruction cache 260 includes a controller 284. In addition, several control circuits are shown without the various connections extending throughout the block diagram. These are prefetch/flush controller 286, level one fetch controller 288, write controller 290 and system access controller 292. Finally, a system bus controller 294 is shown.

Figure 10:
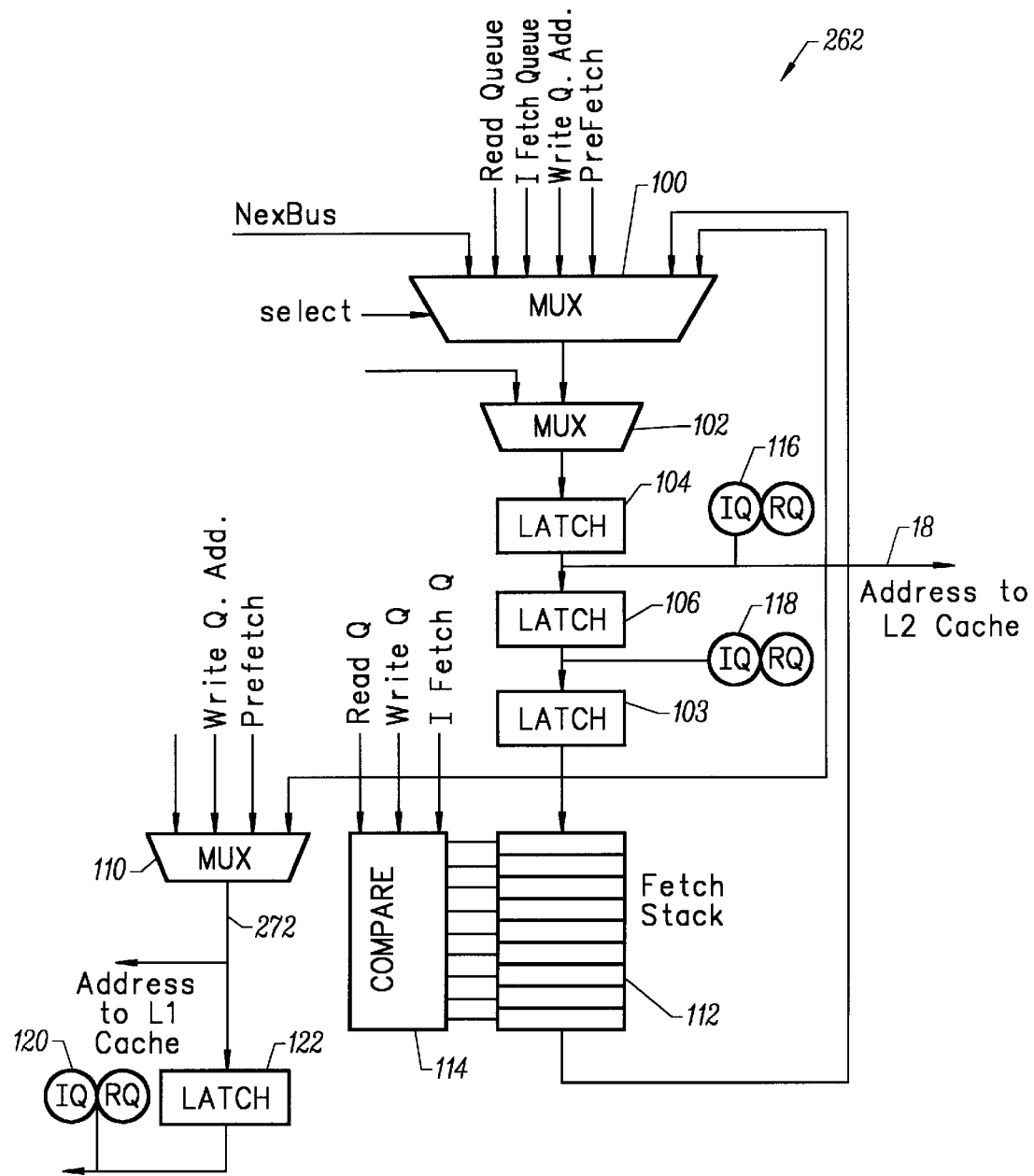
FIG. 10 is a block diagram of the address pipeline of FIG. 9.

FIG. 10 is a block diagram of the address pipeline 262 of FIG. 9. The addresses from the various other units of FIG. 9 are provided to a multiplexer 100. The output of this multiplexer is provided to a second multiplexer 102, and then to a three-stage pipeline consisting of latches 104, 106 and 108. The output of latch stage 104 is provided as an address to the second level cache 16 of FIG. 1 on address lines 18. The output of latch stage 108 is provided through a multiplexer 110 to the first level cache memories 256 and 260 of FIG. 9 on address lines 272.

A fetch stack of registers 112 is coupled between latch 108 and an input of multiplexer 100. This is a push-down stack which is used for cache line replacements. In particular, when a multiple-cycle replacement from the second level cache to the first level cache is to be done, the addresses are stored in the fetch stack and sequentially fed to the address pipeline of latches 104, 106 and 108. The four individual valid bits 88 (shown in FIG. 7) in the status word enable the fetch stack 112 to treat the replacement of each word of the cache line as a separate operation. In the event of a higher priority need to go to the second level cache, multiplexer 100 can select another address for putting into latch 104, rather than an address from the fetch stack. After that second level cache access is completed, the replacement of the cache lines with the addresses in the fetch stack 112 can be resumed.

Coupled to stack 112 is compare logic 114. This logic has inputs from the read queue, write queue and instruction fetch queue of FIG. 9. This allows a comparison to be done of in-progress second level to first level cache replacements in parallel with a first level cache look-up. This avoids the need to do yet another second level cache look-up to determine if the desired information is in the second level cache, since this information is provided in the fetch stack 112.

In addition to compare logic 114, three different comparison circuits indicated as IQ or RQ in circles are provided for doing comparisons with instruction queue and read queue addresses, respectively. These are comparison circuits 116, 118 and 120 coupled to the outputs of latches 104, 106 and 122, respectively. This allows the controller to determine if reads or instruction fetches are present in the address pipeline. If they are present, they are already being accessed from either the first level cache or the second level cache, and the data is already in or about to be placed in the data pipeline. Accordingly, the subsequent access is not necessary since one is already in progress. Thus, a short circuit of the accessing procedure is possible.

Figure 11:
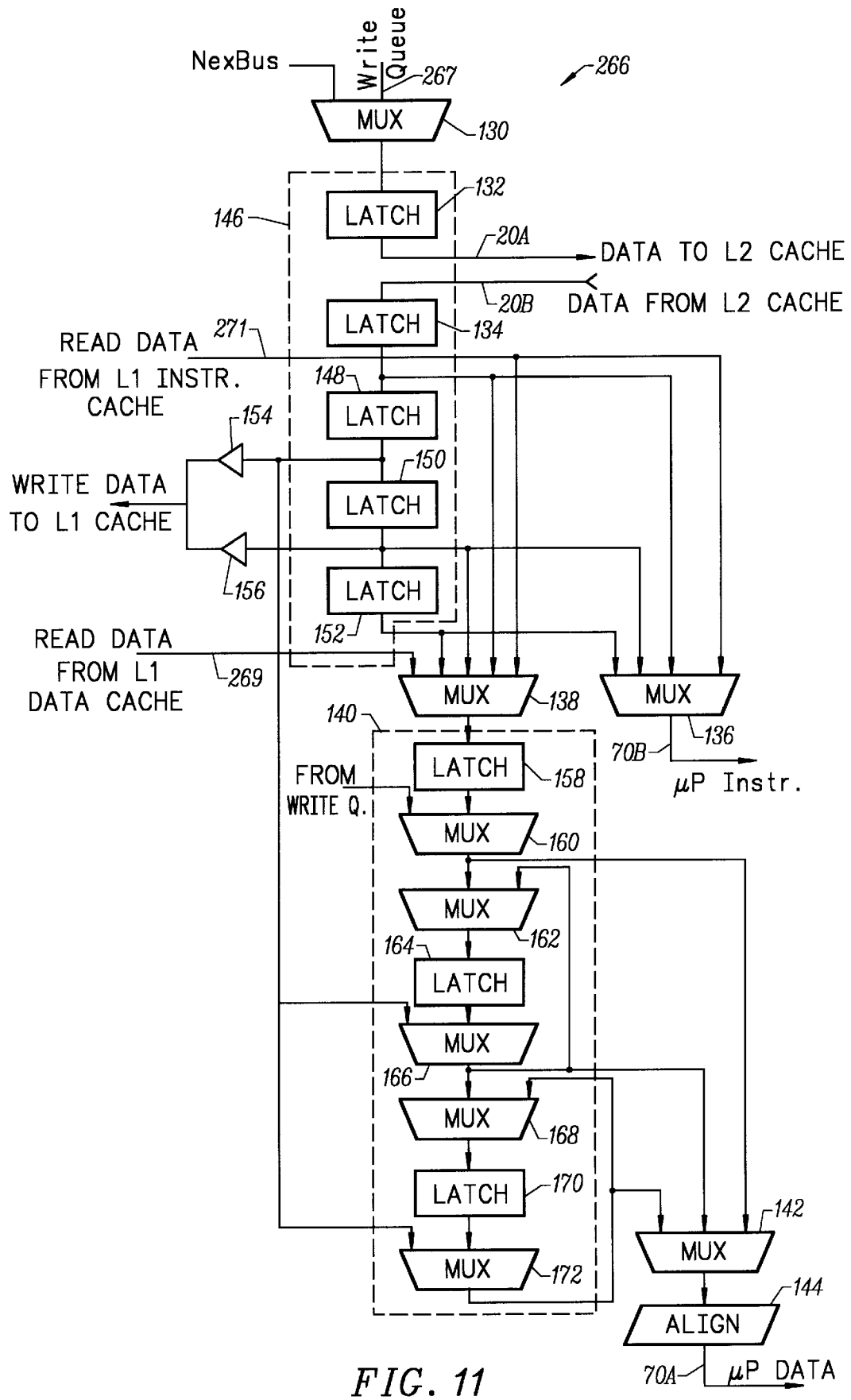
FIG. 11 is a block diagram of the data pipeline of FIG. 9.

FIG. 11 is a block diagram of data pipeline 266 of FIG. 9. Write data from write queue 248 of FIG. 9 is provided on bus 267 to a multiplexer 130. The output of the multiplexer is provided to a write data pipeline 146. Pipeline 146 includes a latch 132, which is connected to the second level cache by bus 20A. Data returned from the second level cache on bus 20B is provided to a latch 134. The data through latch 134 and multiplexer 136 is used for providing instructions back to the microprocessor on bus 70B. It is also available to be provided through multiplexer 138 to a read data pipeline 140. The path through read data pipeline 140 is used for providing data back to the microprocessor on bus 70A through a multiplexer 142 and alignment circuit 144. The data provided through multiplexer 136 is instructions which are provided to the microprocessor instruction register through bus 70B.

Latches 132 and 134 form part of a write data pipeline 146 which also includes latches 148, 150 and 152. The outputs of latches 148 and 150 are provided through transceivers 154 and 156, respectively, to bus 268 which connects to the write data input of the first level instruction and data caches. The output latch 152 is provided to the multiplexers 138 and 136 for return to the microprocessor. Read data from the first level instruction cache is provided on bus 271 to both multiplexers 138 and 136. Read data from the first level data cache is provided on bus 269 to only the multiplexer 138 for the read data pipeline 140. Since the read data will never have instructions, it is only provided to this pipeline, while the instruction cache may have immediate data, and thus is provided to both the multiplexer 136 for return to the instruction register and to multiplexer 138 for provision to the read pipeline. The multiplexers allow data in the data pipeline 146 to be provided to the microprocessor upon a hit on a corresponding address in the address pipeline.

Write data pipeline 146 stores in multiple stages the data to be written to either the first level instruction or data caches from either the second level cache on bus 20B or from main memory. If either data or instructions in the write data is detected by a hit on a corresponding address in the address pipeline, the data can be directly provided to the microprocessor from any of the stages through multiplexer 138 and read pipeline 140 to the microprocessor data bus 70A. Alternately, if it is an instruction which is detected, this can also be provided from any of the multiple stages through multiplexer 136 to the microprocessor instruction bus 70B.

Read data pipeline 140 includes a latch 158 which is provided to a multiplexer 160. The other input of multiplexer 160 comes from the write queue directly. A second multiplexer 162 can provide its output directly to the microprocessor through multiplexer 142, and receives additional feedback input from a subsequent stage in the pipeline. Another latch 164 is provided, with another multiplexer 166 having additional input from an intermediate stage of write data pipeline 146. This is followed by multiplexer 168, latch 170 and final multiplexer 172. The multiplexers allow for input of data at different portions of the read pipeline from the write data pipeline, as well as the outputting of data from different portions to the microprocessor through multiplexer 142. In addition, feedback loops are provided to allow data to be recycled or reordered in the pipeline.

Figure 12:
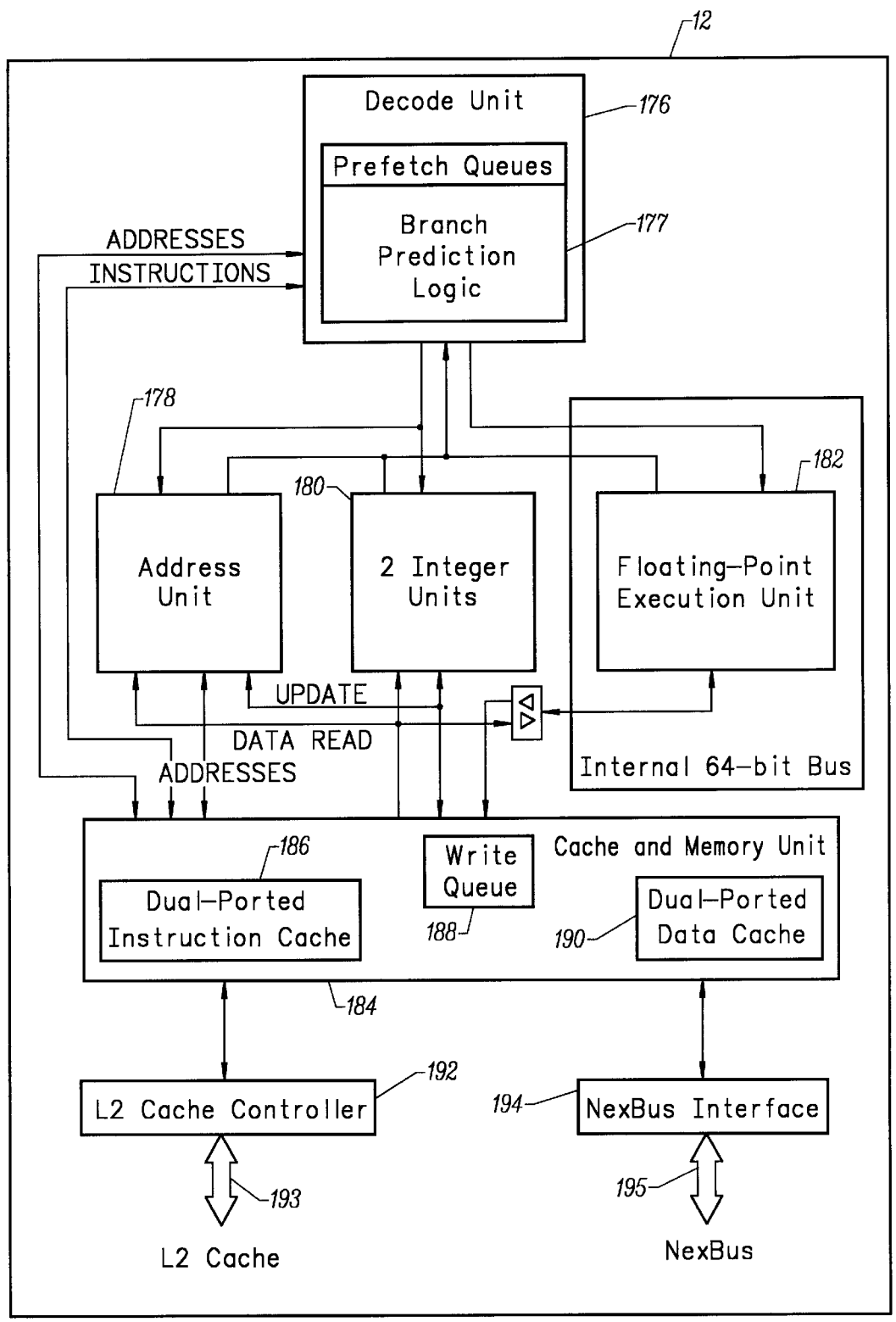
FIG. 12 is a more detailed block diagram of the components of the microprocessor in FIG. 1.

FIG. 12 is a more detailed block diagram of the single-chip microprocessor 12 of FIG. 1. The microprocessor 12 includes a decode unit 176 which performs instruction fetch, instruction decode and pipeline control. Decode unit 176 includes a prefetch block 177 with branch prediction logic that can interleave instruction prefetches of up to three simultaneous instruction streams and contains a fully-associative branch prediction cache which is described in U.S. Pat. No. 5,093,778, hereby incorporated by reference. An address unit 178 coupled to decode unit 176 calculates effective addresses, performs segment relocation and implements a demand page memory management system. Address unit 178 also includes a translation look-aside buffer.

A block of two integer execution units 180 performs single cycle execution of most integer instructions. It contains a multiplier and accumulator array, as well as microcode for integer multiply and divide instructions. The pipeline control architecture allows the integer units 180 to perform parallel and/or out-of-order execution of integer instructions. A more complete description of these units is contained in U.S. Pat. No. 5,226,126, incorporated by reference above. A floating point execution unit 182 may also be coupled to decode unit 176.

Coupled to each of these units by internal bus connections is a cache and memory unit 184, which includes a dual-ported instruction cache 186, a write queue 188 and a dual-ported data cache 190. The cache and memory unit 184 is coupled to an L2 cache controller 192 that interfaces with an off-chip level 2 cache across a dedicated L2 cache bus 193 that includes address, data and control lines. According to one embodiment of the present invention, dedicated L2 cache bus is made up of 91 signal lines, including 64 data lines, 15 address lines and 12 control lines. The NexBus system bus 24 (shown in FIG. 1) is connected to the cache and memory unit 184 through NexBus interface 194 and address, data and control lines 195.

The hierarchy of storage mechanisms in the microprocessor architecture shown in FIG. 12 maximizes the speed at which the functional units can access data with a minimum of traffic across the cache and system buses. As discussed above in conjunction with FIGS. 3 and 4, control for the MESI cache coherency protocol is built into this hierarchy. The storage hierarchy contributes to access speed at the system level with other buffers and caches. For example, a system using a memory controller chip that maintains a prefetch queue between L2 cache 16 and main memory 50 (shown in FIG. 1) can continuously pre-load cache blocks in anticipation of the microprocessor's next request for a cache fill operation. The fast access speeds of microprocessor 12 facilitate parallel and/or out-of-order execution of integer instructions by integer units 180, which requires very fast input of data to the microprocessor functional units. Also, the access speed of the processor is improved by the combination of the fast data input and the pipelined cache control that allows the concurrent look-up of tag addresses in the first and second level caches. The machine is not stalled after a first level cache miss, since the subsequent address tags can be handled by performing a look-up to the first level cache while the previous address tags are compared with second level cache tags.

Figure 13:
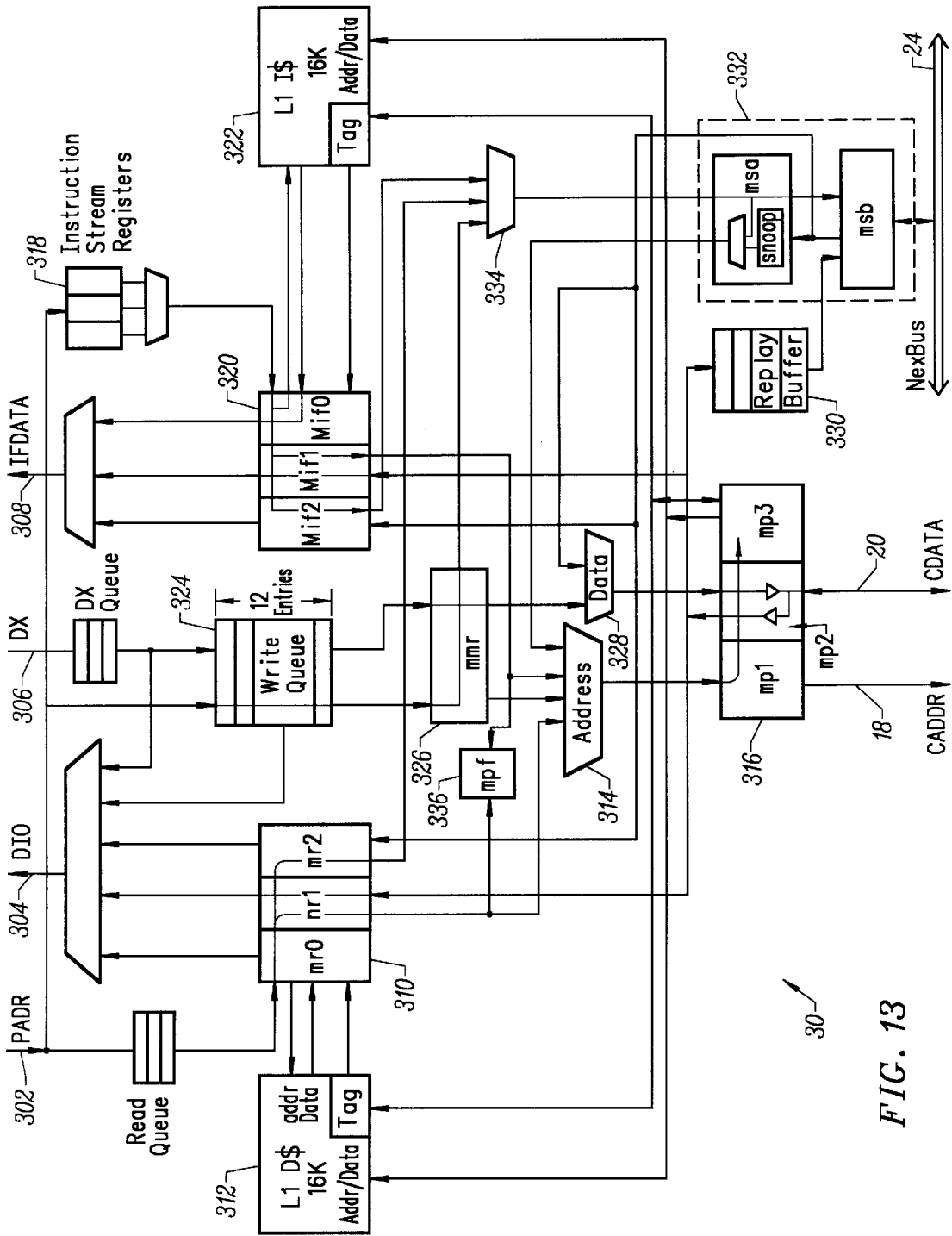
FIG. 13 is a more detailed block diagram of the components of the memory control system of FIG. 1.

FIG. 13 is a more detailed block diagram showing the features of MCS block 30 of FIG. 1 and FIG. 2. External bus connections are shown at the bottom of the figure. Specifically, address bus 18 and data bus 20 correspond to the buses shown in FIG. 1 and couple the MCS block 30 to the L2 cache 16 (shown in FIG. 1). System bus 24 couples the microprocessor to other system elements, as in FIG. 1. Internal bus connections, included in internal bus 38 of FIG. 1, are shown at the top of FIG. 13. PADR address bus 302 provides address information to the MCS block to retrieve information from cache memory. DIO data bus 304 provides read data from the cache to other processor elements, while DX data bus 306 provides write data from the processor to the cache. IFDATA bus 308 provides instructions that have been fetched from the cache back to the microprocessor.

As noted above, MCS block 30 has a multiple stage pipeline that allows the concurrent look-up of tag addresses in the first and second level caches. If there is not a hit in the first level cache for a first stage of a pipeline, that address is moved to the second stage for look-up in the second level cache, while a new address can be entered into the first stage for look-up in the first level cache. This avoids having to stall the machine while a first level cache miss is doing a subsequent comparison with second level cache tags.

Implementation of cache concurrency is shown, for example, in the read pipeline. Read pipeline 310 has three stages, MR0, MR1 and MR2. Each of these stages includes a state machine to control operation of the pipeline stage. In operation, an address is provided by address preparation unit (AP) 34 (shown in FIG. 1) on PADR bus 302 to the first stage MR0 of read pipeline 310. First stage MR0 accesses the first level L1 data cache 312 to determine whether the requested address and corresponding data are in the L1 cache. L1 data cache 312 may be of different sizes, of course. For example, in one particular embodiment, the L1 data cache may be 16 kB. If there is a L1 cache miss, the address is transferred to the second stage MR1 of read pipeline 310. MR1 is responsible for accessing the second level L2 data cache 16 (shown in FIG. 1) to look for the requested address and corresponding data that were not found in L1 data cache 312. The requested address is transferred by the second stage MR1 of read pipeline 310 to address multiplexer 314, which is coupled to the memory pipeline 316 that serves as the L2 cache interface. If the requested address is still not found in L2 cache, it is transferred to the final stage MR2, which accesses the system bus 24 to retrieve the data from main memory 50 (shown in FIG. 1).

Cache concurrency in read pipeline 310 is achieved by releasing the preceding stage in the pipeline after a cache miss, freeing it to handle the subsequent request. For example, first stage MR0 is released after an L1 cache miss, when the requested address is transferred to second stage MR1. By releasing first stage MR0 while second stage MR1 is busy searching in the L2 cache for the requested address, first stage MR0 is free to accept the next address from PADR address bus 302 and search in L1 cache 312 for the subsequent address and corresponding data. Similarly, after an L2 cache miss, second stage MR1 is released when third stage MR2 receives the requested address and begins an access to main memory to retrieve the first requested address and data. By releasing second stage MR1, it can accept the subsequent address, which will already have resulted in a L1 cache miss, and search through the L2 cache while third stage MR2 is busy accessing main memory.

The instruction fetch circuitry operates in much the same way as the read pipeline. A first address is provided by address preparation unit (AP) 34 (shown in FIG. 1) on PADR bus 302 to a set of instruction stream registers 318. These registers store different possible instruction streams in a program that may result, for example, from branch instructions. Branch prediction circuitry selects one of these instruction streams, and the selected address is transferred to the instruction fetch pipeline 320, which is also divided into three stages, MIF0, MIF1 and MIF2. Again, each of these stages includes a separate state machine to control operation. As in the case of the read pipeline, first stage MIF0 accesses the first level L1 instruction cache 322 to determine whether the requested address and corresponding instruction are in the L1 cache. Again, L1 instruction cache 322 may be of differing sizes, such as, for example, 16 kB. If there is an L1 cache miss, the address is transferred to the second stage MIF1 of instruction fetch pipeline 320. MIF1 is responsible for accessing the second level L2 cache 16 (shown in FIG. 1) to look for the requested address and corresponding instruction that was not found in L1 cache 322. The requested address is transferred by the second stage MIF1 of instruction fetch pipeline 320 to address multiplexer 314, which is coupled to the memory pipeline 316 that serves as the L2 cache interface. If the requested address is still not found in L2 cache, it is transferred to the final stage MIF2, which accesses the system bus 24 to retrieve the instruction from main memory 50.

Cache concurrency in instruction fetch pipeline 320 is achieved in the same manner as with the read pipeline, by releasing the preceding stage in the pipeline after a cache miss, freeing it to handle a subsequent request. For example, first stage MIF0 is released after an L1 cache miss, when the requested address is transferred to second stage MIF1. By releasing first stage MIF0 while second stage MIF1 is busy searching in the L2 cache for the requested address, first stage MIF0 is free to accept the next address from instruction stream register 318 and search in L1 cache 322 for the subsequent address and corresponding instruction. Similarly, after an L2 cache miss, second stage MR1 is released when third stage MR2 receives the requested address and begins an access to main memory to retrieve the first requested address and instruction. By releasing second stage MR1, it can accept the subsequent address, which will already have resulted in an L1 cache miss, and search through the L2 cache while third stage MIF2 is busy accessing main memory.

Write queue 324 also accesses the L2 cache to store data in the cache. Write queue 324 receives write data from DX bus 306 and corresponding address information from PADR bus 302. Associated address and data information are stored as one entry in the write queue 324, which has twelve entries. Entries are transferred sequentially to the memory write state machine (MWR) 326, which transfers the address of a write operation to the address multiplexer 314 and the associated data to a data multiplexer 328, both of which are coupled to the L2 cache interface 316.

The L2 cache interface, memory pipeline 316, is also separated into three stages, MP1, MP2 and MP3, each one a separate state machine. First stage MP1 transfers the requested address to the L2 cache on L2 address bus 18. Second stage MP2 transfers data to and from the L2 cache on L2 data bus 20. In the case of a read operation, for example, if the address generated at stage MP1 results in an L2 cache hit, the corresponding data is transferred back through stage MP2 to MCS block 30 and on to the other processor blocks, such as IEU 32 (shown in FIG. 1). In the case of a write operation, on the other hand, after a write address is transferred by MP1 to the L2 cache on address bus 18, the associated data is transferred by MP2 on data bus 20 to the L2 cache. Third stage MP3 affords access only to both first level L1 data and instruction cache memories 312 and 322, respectively, to place a copy of an L2 entry into the L1 cache, since the L1 cache is a subset of the L2 cache.

The L1 cache is a "writethrough" cache, since, after an entry has been written to the L2 cache, the same entry is written through MP3 to the appropriate L1 cache, either data cache 312 or instruction cache 322. This operation ensures that the appropriate L1 cache (data or instruction) will reflect any changes that have been made to the L2 cache. Since the L1 cache is updated after the L2 cache, if first stage MR0 of read pipeline 310 searches in the L1 data cache 312 for an address that is currently being updated, MR0 will incur a cache miss. However, since the entry is updated in L2 cache before L1 cache, second stage MR1 will have a cache hit in the L2 cache. The L2 cache is a "writeback" cache, wherein all write operations are done locally to the L2 cache 16, and not globally to main memory 50, until it is necessary to replace the cache entry in L2 cache 16. At that point, the entry to be replaced is placed in replacement buffer 330, from which it is transferred on system bus 24 to be stored in main memory. System performance is optimized by performing all writes to an address locally in the L2 cache across the dedicated L2 cache buses until it is necessary to store the data associated with that address in main memory, since the number of accesses across the slower system bus is minimized.

Address multiplexer 314 is coupled to first stage MP1 of L2 cache interface 316, since first stage MP1 is responsible for transferring the address to the L2 cache. Inputs to address multiplexer 314 come from read pipeline 310, instruction fetch pipeline 320, write queue 324, system bus control circuit 332 and prefetch state machine 336. Similarly, data multiplexer 328 is coupled to second stage MP2 of L2 cache interface 316, since second stage MP2 is responsible for transferring the data to and from the L2 cache. Inputs to data multiplexer 328 come from write queue 324 and system bus control circuit 332. Selection of the appropriate input for each multiplexer is handled by other microprocessor circuitry.

The interface between MCS block 30 and system bus 24 is the system bus interface circuit 332, which includes two separate state machines, MSA and MSB. The input to state machine MSA is coupled to multiplexer 334, which receives inputs from third stage MR2 of read pipeline 310, third stage MIF2 of instruction fetch pipeline 320 and from memory write state machine (MWR) 326. Depending upon the select input to multiplexer 334, one of these inputs is selected to be transferred to main memory 50 across system bus 24.

Figure 14:
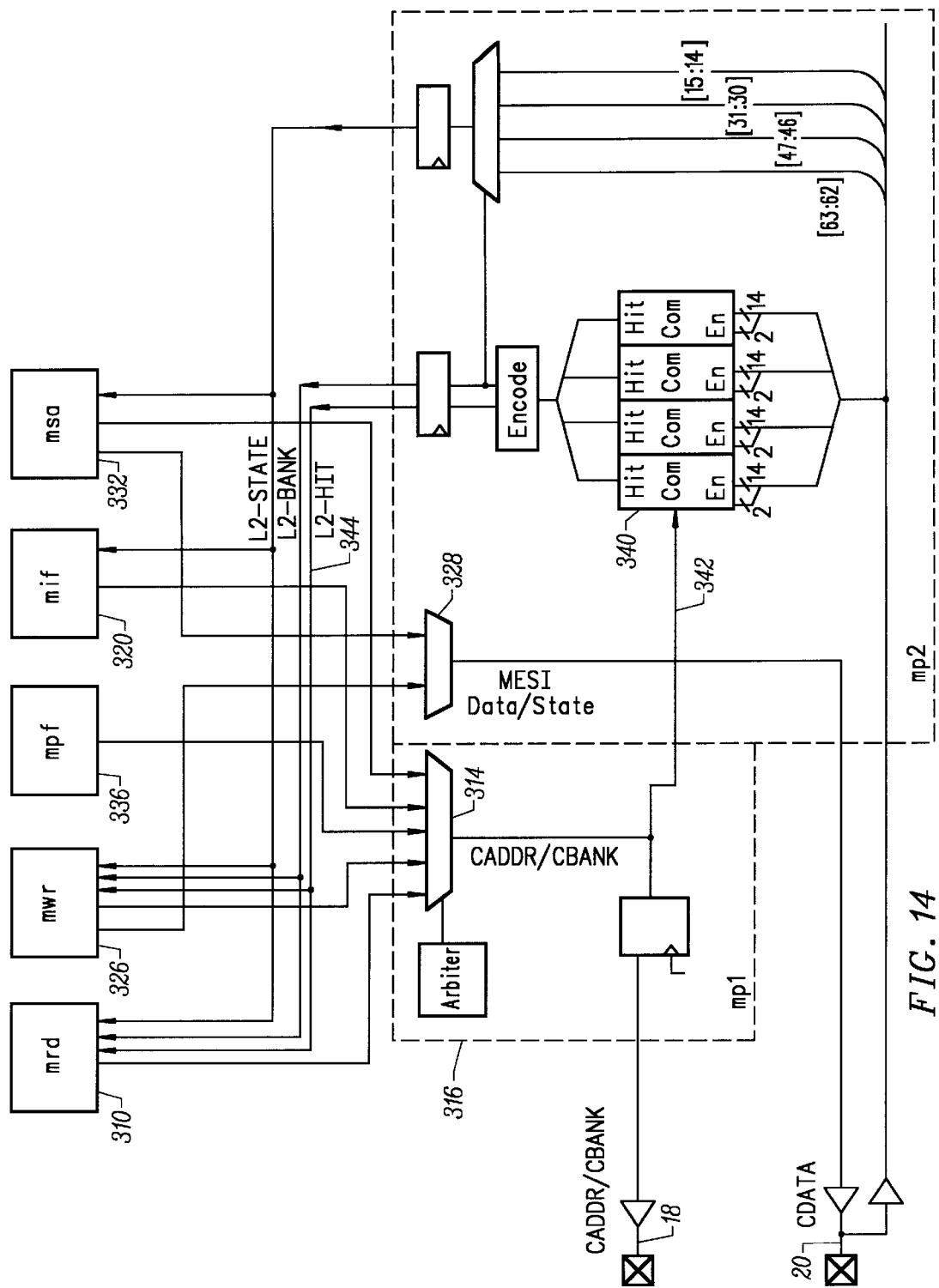
FIG. 14 is a block diagram of the address comparison circuitry in the memory control system.

FIG. 14 is a block diagram of the tag address comparison circuitry in the L2 cache interface 316. As in FIG. 13, L2 cache address bus 18 is coupled to first stage MP1 and L2 cache data bus 20 is coupled to second stage MP2. Address multiplexer 314 receives address input from all five clients of the L2 cache interface 316: read pipeline 310, instruction fetch pipeline 320, write queue 326, system bus interface 332 and prefetch state machine 336. Data multiplexer 328 receives data input from write queue 326 and system bus interface 332. Second stage MP2 includes a comparison circuit 340 that determines whether or not an L2 cache hit has occurred. One input to comparison circuit 340 is the requested address signal 342 from stage MP1 that is being looked up in L2 cache memory 16. The other inputs are the address tags on data retrieved from the L2 cache on L2 cache data bus 20. Comparison circuit 340 compares the requested address with the tags of the retrieved cache entries to see if there is a match. If so, the L2_HIT signal 344 is asserted, indicating to microprocessor 12 that an L2 cache hit has occurred.

As will be understood by those familiar with the art, the present invention may be embodied in other specific forms without departing from the spirit or essential characteristics thereof. For example, the invention could be used with a 2-way or 8-way set associative cache. The scheme to store L2 status information in L1 to speed up writes to L2, the assignments of cacheable regions to reduce the number of bits in a tag and the priority scheme for cache block replacement for one type of address space over another may be implemented in a cache system that uses separate tag and data storage for the L2 cache. The priority scheme for cache replacements of one type of address space over another is also applicable for one address region over another. The type bits to classify L1 cache blocks can be extended to L2 cache blocks also. The assignments of cacheable regions to reduce the number of bits in a tag, the priority given to one type of address space over another, or one type of address region over another for cache block replacement, and the use of type bits to classify cache blocks are equally applicable in a direct-mapped or set-associative cache system, or a cache system that employs parity checking or error correction. Furthermore, a two-stage or single stage address pipeline could be used with the fetch stack of the present invention. Accordingly, the disclosure of the preferred embodiment of the invention is intended to be illustrative, but not limiting, of the scope of the invention which is set forth in the following claims.

What is claimed is:

1. A computer system comprising:
   a microprocessor comprising:
      a processor address bus;
      a processor data bus;

a decoder unit coupled to said processor address bus and to said processor data bus;

an address preparation unit coupled to said processor address bus and to said processor data bus;

an integer execution unit coupled to said processor address bus and to said processor data bus;

a memory control system coupled to said processor address bus and to said processor data bus, said memory control system including
    a first level cache,
        a pipeline having a first plurality of interconnected stages, a first one of said first plurality of interconnected stages coupled to said first level cache;
    a second level cache; and
    a dedicated cache bus coupling said second level cache to a second one of said first plurality of interconnected stages, wherein said first and second ones of said first plurality of interconnected stages are configured to concurrently access said first and second level caches, respectively;

a main memory; and a system bus coupling said microprocessor to said main memory.

2. The computer system of claim 1, wherein:

said first level cache is a first level data cache, and said pipeline is a read pipeline, said read pipeline being coupled to said processor address bus and said processor data bus;

and said memory control system further comprises:

a first level instruction cache;

an instruction fetch pipeline having a second plurality of interconnected stages, said instruction fetch pipeline coupled to said processor address bus and said processor data bus, a first one of said second plurality of stages coupled to said first level instruction cache;

a system bus interface coupled to said system bus; and a second level cache interface coupling said second one of said first plurality of stages, a second one of said second plurality of stages, said instruction fetch pipeline, and said system bus interface to said dedicated cache bus.

3. The computer system of claim 2, wherein:

said first one of said first plurality of interconnected stages is further coupled to said processor address bus;

said second one of said first plurality of interconnected stages is further coupled to said first one of said first plurality of interconnected stages; and a third one of said first plurality of interconnected stages is coupled to said system bus interface and to said second one of said first plurality of interconnected stages.

4. The computer system of claim 3, wherein:

said first one of said first plurality of interconnected stages is configured to search said first level data cache for a requested address from said processor address bus;

said second one of said first plurality of interconnected stages is configured to transfer said requested address to said second level cache interface, if said requested address was not found in said first level data cache; and said third one of said first plurality of interconnected stages is configured to transfer said requested address to said system bus interface, if said requested address was not found in said second level cache.

5. The computer system of claim 2, wherein:

said first one of said second plurality of interconnected stages is further coupled to said processor address bus;

said second one of said second plurality of interconnected stages is further coupled to said first one of said second plurality of interconnected stages; and a third one of said second plurality of interconnected stages is coupled to said system bus interface and to said second one of said second plurality of interconnected stages.

6. The computer system of claim 5, wherein:

said first one of said second plurality of interconnected stages is configured to search said first level instruction cache for a requested address from said processor address bus;

said second one of said second plurality of interconnected stages is configured to transfer said requested address to said second level cache interface, if said requested address was not found in said first level instruction cache; and said third one of said second plurality of interconnected stages is configured to transfer said requested address to said system bus interface, if said requested address was not found in said second level cache.

7. The computer system of claim 2, said microprocessor further comprising:

a write queue coupled to said processor address bus, said processor data bus and said second level cache interface; and said second level cache interface further comprising:

an address multiplexer coupled to said read pipeline, said write queue, said instruction fetch pipeline and said system bus interface;

a data multiplexer coupled to said write queue and said system bus interface;

a first stage adapted to receive address information from said address multiplexer;

a second stage adapted to receive data information from said data multiplexer;

a third stage coupled to said first level data cache and said first level instruction cache; and means for comparing an address received from said processor address bus with an address received from said second level cache to determine whether said address from said processor address bus is stored in said second level cache.

8. The computer system of claim 7, said second level cache interface further comprising:

said first stage of said second level cache interface including means for searching in said second level cache for a requested address from said processor address bus;

said second stage of said second level cache interface including means for transferring data to and from said second level cache; and said third stage of said second level cache interface including means for transferring data to said first level data cache and to said first level instruction cache.

9. A cache control system for controlling a cache memory system having a first level data cache, a first level instruction cache, and a second level cache, said cache control system comprising:

a dedicated cache bus coupled to the second level cache;

a read pipeline having a first plurality of interconnected stages, a first one plurality of said first plurality stages coupled to the first level data cache;

an instruction fetch pipeline having a second plurality of interconnected stages, a first one plurality of said second plurality stages coupled to the first level instruction cache;

a write queue;

a second level cache interface coupling a second one of said first plurality of interconnected stages, a second one of said second plurality of interconnected stages, and said write queue to said dedicated cache bus, wherein said first and second ones of said first plurality of interconnected stages are configured to concurrently access said first and second level caches, respectively; and a system bus interface coupled to a third one of said first plurality of interconnected stages, a third one of said second plurality of interconnected stages, said second level cache interface, and said write queue.

10. The cache control system of claim 9, said second level cache interface further comprising:

an address multiplexer coupled to said read pipeline, said write queue, said instruction fetch pipeline and said system bus interface;

a data multiplexer coupled to said write queue and said system bus interface;

a first stage adapted to receive address information from said address multiplexer;

a second stage adapted to receive data information from said data multiplexer;

a third stage coupled to said first level data cache and said first level instruction cache; and means for comparing an address received from said address multiplexer with an address received from said second level cache to determine whether said address from said processor address bus is stored in said second level cache.

11. The cache control system of claim 9 wherein said dedicated cache bus further comprises at least 64 bits.

12. The cache control system of claim 9, wherein said first and second ones of said second plurality of interconnected stages are configured to concurrently access said first and second level caches, respectively.

13. In a computer system including a microprocessor having an internal first level cache and an external second level cache, a method for concurrently performing a lookup in the first level cache and the second level cache, the method comprising the steps of:

a) providing a dedicated level two cache bus coupling the microprocessor to the external second level cache;

b) providing a multi-stage read pipeline in the microprocessor coupled to the first level cache;

c) transferring a first requested address to a first stage of said multi-stage pipeline;

d) performing a look-up from said first stage for said first requested address in the first level cache;

e) transferring said first requested address to a second stage of said multi-stage pipeline if said first requested address is not found in the first level cache;

f) performing a look-up from said second stage for said first requested address in the second level cache;

g) transferring a second requested address to said first stage;

h) performing a look-up from said first stage for said second requested address in the first level cache concurrently with step f).

14. A cache control system having a first level data cache, a first level instruction cache and a second level cache comprising:

a dedicated cache bus;

an instruction fetch pipeline coupled to the first level instruction cache;

a write queue;

a system bus interface coupled to said instruction fetch pipeline and said write queue;

a second level cache interface coupling said instruction fetch pipeline, said write queue, and said system bus interface to said dedicated cache bus; and a read pipeline having
a first stage coupled to the first level data cache,
a second stage coupled to said second level cache interface and to said first stage of said read pipeline, and
a third stage coupled to said system bus interface and to said second stage of said read pipeline, wherein said first stage and said second stare are configured to concurrently access said first level data cache and said second level cache, respectively.

15. A cache control system having a first level data cache, a first level instruction cache and a second level cache comprising:

a dedicated cache bus;

a read pipeline having coupled to the first level data cache;

a write queue;

a system bus interface coupled to said read pipeline and said write queue;

a second level cache interface coupling said read pipeline said write queue and said system bus interface to the dedicated cache bus; and an instruction fetch pipeline having
a first stage coupled to the first level instruction cache,
a second stage coupled to said second level cache interface and to said first stage of said instruction fetch pipeline, and
a third stage coupled to said system bus interface and to said second stage of said instruction fetch pipeline, wherein said first stage and said second stage are configured to concurrently access the first level instruction cache and the second level cache, respectively.

* * * * *